United States Patent
Yamagishi

(10) Patent No.: US 6,665,122 B1
(45) Date of Patent: Dec. 16, 2003

(54) PROJECTION-TYPE IMAGE DISPLAY APPARATUS

(75) Inventor: Shigekazu Yamagishi, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 26 days.

(21) Appl. No.: 10/130,562

(22) PCT Filed: Nov. 28, 2000

(86) PCT No.: PCT/JP00/08380
§ 371 (c)(1),
(2), (4) Date: May 17, 2002

(87) PCT Pub. No.: WO01/46754
PCT Pub. Date: Jun. 28, 2001

(30) Foreign Application Priority Data

Dec. 20, 1999 (JP) ............................... 11-360252

(51) Int. Cl.[7] ........................ G02B 27/14; G02B 27/12
(52) U.S. Cl. .................. 359/634; 359/640; 359/638
(58) Field of Search ................... 359/629, 634, 359/637, 638, 639, 640

(56) References Cited

U.S. PATENT DOCUMENTS 5,644,432 A * 7/1997 Doany ..................... 359/634

2002/0181117 A1 * 12/2002 Huang ..................... 359/634

FOREIGN PATENT DOCUMENTS

| JP | 3-202845 | 9/1991 |
| JP | 8-50227 | 2/1996 |

* cited by examiner

Primary Examiner—David N. Spector
(74) Attorney, Agent, or Firm—Merchant & Gould, P.C.

(57) ABSTRACT

Red, green and glue light beams from light source portions (301, 302, 303) are modulated respectively by light valve units (317, 319, 321) of a light valve portion (304) and enter a color combination optical system (305). The color combination optical system (305) includes three triangular prisms (325, 326, 327), each having a vertex angle of about 30 degrees, and is formed by joining the prisms together with dichroic mirror surfaces (328, 329) interposed therebetween. The respective light beams entering the planes of the prisms opposite to their vertex angles are combined in the color combination optical system (305) and emitted from an exit plane of the prism (327). The optical path lengths of the respective light beams between the incidence planes and the exit plane (332) are substantially equal to one another. Then, a projection lens (306) magnifies and projects the combined light beam onto a screen. This configuration can increase the quality of projection images and reduce the size and cost of the apparatus.

11 Claims, 8 Drawing Sheets

PROJECTION-TYPE IMAGE DISPLAY APPARATUS

BACKGROUND OF THE INVENTION

1. Technical Field

The present invention relates to a three-plate projection-type image display apparatus including light valves (e.g., liquid crystal panels), one each for red, green and blue light beams, as a modulation means so that display images of the respective light beams are combined in the apparatus and projected to form a magnified image on a screen.

2. Background Art

The projector market, especially for projection-type image display apparatuses using a transmission-type liquid crystal panel, now is growing rapidly. The trends of products can be divided into two major categories: higher brightness and smaller size. In particular, the diagonal size of an effective aperture of a liquid crystal panel is reduced from 1.3 inches, which has been a mainstream diagonal size, to 0.9 inches at present and is expected to be reduced further in the future. While reducing the effective aperture size, the transmission-type liquid crystal panel has a very small black matrix (BM) and a numerical aperture high enough to be comparable with that of a conventional liquid crystal panel that is one size larger than the above liquid crystal panel. With the implementation of such a small-size high-density liquid crystal panel, a color combination portion for combining display images on the liquid crystal panels also needs to provide higher accuracy.

Next, the configuration of a conventional projection-type image display apparatus using liquid crystal panels will be described. Three-plate projection-type image display apparatuses including liquid crystal panels, one each for red, green and blue light beams, can be classified roughly into two categories according to their characteristics in color combination: a cross-prism system and a mirror-sequential system. FIGS. 7 and 8 schematically show the basic configurations of conventional projection-type image display apparatuses employing the cross-prism system and the mirror-sequential system, respectively. The following is an explanation for each of the configurations.

As shown in FIG. 7, a cross-prism projection-type image display apparatus 100 includes a light source portion 101, a color separation optical system 102, a relay optical system 103, a light valve portion 104, a color combination optical system 105, and a projection optical system (a projection lens) 106.

The light source portion 101 includes a light source 107 and a reflector 108. The light source 107 forms an arc by discharge between electrodes to generate a randomly polarized light beam. The reflector 108 reflects the light beam from the light source 107 in one direction along its axis of rotational symmetry.

A light beam from the light source portion 101 enters a blue-reflection dichroic mirror 109 of the color separation optical system 102, where a blue light beam of the incident light is reflected. Then, the blue light beam is reflected from a total reflection mirror 110 and passes through a condenser lens 111 into a blue light valve unit 112. Green and red light beams are transmitted by the blue-reflection dichroic mirror 109 and enter a green-reflection dichroic mirror 113, where the green light beam is reflected and passes through a condenser lens 114 into a green light valve unit 115. The red light beam is transmitted by the green-reflection dichroic mirror 113 and enters the relay optical system 103. Then, the red light beam passes through an entrance lens 116, a total reflection mirror 117, an intermediate lens 118, a total reflection mirror 119, and a condenser lens 120 into a red light valve unit 121.

The light valve portion 104 includes the blue, green and red light valve units 112, 115 and 121, which are arranged in accordance with the respective light beams. Each of the light valve units 112, 115 and 121 includes an entrance polarizing plate 122, a liquid crystal panel 123, and an exit polarizing plate 124, as shown in FIG. 2. The entrance polarizing plate 122 is rectangular in shape and designed, e.g., to transmit light polarized in the short side direction and to absorb light polarized in the direction perpendicular thereto. The light beam passing through the entrance polarizing plate 122 enters the liquid crystal panel 123. The liquid crystal panel 123 has many pixels arranged in the form of an array and can change the polarization direction of the incident light at each pixel aperture with an external signal. In this example, when the pixels are not driven, the liquid crystal panel 123 transmits the incident light while rotating its polarization direction by 90 degrees; when the pixels are driven, the liquid crystal panel 123 transmits the incident light without changing its polarization direction. The exit polarizing plate 124 has polarization characteristics in the direction perpendicular to the entrance polarizing plate 122. In other words, the exit polarizing plate 124 has a transmission axis in the long side direction of its rectangular outline and transmits light polarized in this direction. Therefore, the light beam that has entered the undriven pixel of the liquid crystal panel 123 and been transmitted with its polarization direction rotated by 90 degrees can pass through the exit polarizing plate 124 because it is polarized in the direction parallel to the transmission axis. On the other hand, the light beam that has entered the driven pixel of the liquid crystal panel 123 and been transmitted with its polarization direction unchanged is absorbed by the exit polarizing plate 124 because it is polarized in the direction perpendicular to the transmission axis.

The light beams thus transmitted through the light valve portion 104 enter the color combination optical system 105. The color combination optical system 105 is a color combination prism formed by joining four triangular prisms so that a blue-reflection dichroic mirror surface 125 and a red-reflection dichroic mirror surface 126 cross at right angles. The blue and red light beams incident on the color combination optical system 105 are reflected from the blue-reflection dichroic mirror surface 125 and the red-reflection dichroic mirror surface 126, respectively, and then enter the projection lens 106, which acts as a projection optical system. The green light beam passes through the blue- and red-reflection dichroic mirror surfaces 125, 126 and enters the projection lens 106.

The projection lens 106 magnifies and projects the incident light onto a screen (not shown). In this manner, images of three light beams, each of which is formed in the light valve portion 104, are combined and displayed as a color image.

As shown in FIG. 8, a mirror-sequential projection-type image display apparatus includes a light source portion 201, a color separation optical system 202, a light valve portion 203, a color combination optical system 204, and a projection optical system (a projection lens) 205.

The light source portion 201 includes a light source 206 and a reflector 207. The light source 206 forms an arc by discharge between electrodes to generate a randomly polarized light beam. The reflector 207 reflects the light beam from the light source 206 in one direction along its axis of rotational symmetry.

A light beam from the light source portion 201 enters a blue-reflection dichroic mirror 208 of the color separation optical system 202, where a blue light beam of the incident light is reflected. Then, the blue light beam is reflected from a total reflection mirror 209 and passes through a condenser lens 210 into a blue light valve unit 211. Green and red light beams are transmitted by the blue-reflection dichroic mirror 208 and enter a green-reflection dichroic mirror 212, where the green light beam is reflected and passes through a condenser lens 213 into a green light valve unit 214. The red light beam is transmitted by the green-reflection dichroic mirror 212 and passes through a condenser lens 215 into a red light valve unit 216.

The light valve portion 203 includes the blue, green and red light valve units 211, 214 and 216, which are arranged in accordance with the respective light beams. Each of the light valve units 211, 214 and 216 includes an entrance polarizing plate 217, a liquid crystal panel 218, and an exit polarizing plate 219, as shown in FIG. 2. The entrance polarizing plate 217 is rectangular in shape and designed, e.g., to transmit light polarized in the short side direction and to absorb light polarized in the direction perpendicular thereto. The light beam through the entrance polarizing plate 217 enters the liquid crystal panel 218. The liquid crystal panel 218 has many pixels arranged in the form of an array and can change the polarization direction of the incident light at each pixel aperture with an external signal. In this example, when the pixels are not driven, the liquid crystal panel 218 transmits the incident light while rotating its polarization direction by 90 degrees; when the pixels are driven, the liquid crystal panel 218 transmits the incident light without changing its polarization direction. The exit polarizing plate 219 has polarization characteristics in the direction perpendicular to the entrance polarizing plate 217. In other words, the exit polarizing plate 219 has a transmission axis in the long side direction of its rectangular outline and transmits light polarized in this direction. Therefore, the light beam that has entered the undriven pixel of the liquid crystal panel 218 and been transmitted with its polarization direction rotated by 90 degrees can pass through the exit polarizing plate 219 because it is polarized in the direction parallel to the transmission axis. On the other hand, the light beam that has entered the driven pixel of the liquid crystal panel 218 and been transmitted with its polarization direction unchanged is absorbed by the exit polarizing plate 219 because it is polarized in the direction perpendicular to the transmission axis.

The light beams thus transmitted through the light valve portion 203 enter the color combination optical system 204. The color combination optical system 204 includes a green-reflection dichroic mirror 220, a red-reflection dichroic mirror 221, and a total reflection mirror 222. The blue light beam emitted from the blue light valve unit 211 passes through the green-reflection dichroic mirror 220 and the red-reflection dichroic mirror 221 in sequence and enters the projection lens 205, which acts as a projection optical system. The green light beam emitted from the green light valve unit 214 is reflected from the green-reflection dichroic mirror 220, passes through the red-reflection dichroic mirror 221, and enters the projection lens 205. The red light beam emitted from the red light valve unit 216 is reflected from the total reflection mirror 222 and the red-reflection dichroic mirror 221 in sequence and enters the projection lens 205.

The projection lens 205 magnifies and projects the incident light onto a screen (not shown). In this manner, images of three light beams, each of which is formed in the light valve portion 203, are combined and displayed as a color image.

The above two projection-type image display apparatuses have typical configurations currently used for presentation, and their characteristics will be described below.

The projection-type image display apparatus using the cross-prism system for color combination (FIG. 7) has the advantages that (1) the focal length and size of the projection lens can be reduced because the projection distance between each of the liquid crystal panels and the projection lens is made shorter, and (2) the accuracy can be ensured easily under vibration and shock because the color combination optical system has a small size and the reflection planes are formed of prisms. However, there are problems as follows: (1) when the four prisms of the color combination optical system 105 are not joined together with sufficient accuracy, a vertical line appears on the center of a projection image due to the interface between the prisms; (2) each of the reflection planes 125, 126 of the color combination optical system 105 is formed by arranging two prisms so that a dichroic mirror surface of one prism is flush with that of the other prism, and thus color irregularity is caused if the two dichroic mirror surfaces of each reflection plane do not have the same spectral characteristic; (3) defocus of a projection image, such as a double image, occurs unless the dichroic mirror surfaces of two prisms that form each of the reflection planes 125, 126 are flush with each other without any distortion and deviation; and (4) the relay optical system 103 is needed in addition to the color separation optical system 102, which increases the apparatus size and also leads to color irregularity when the light source or illumination optical system has non-uniform brightness because the light source image of a light beam that passes through the relay optical system is reversed with respect to the light source images of two other light beams that do not pass though the relay optical system. Considering the improvement in accuracy of the color combination optical system that accompanies the use of such a high definition liquid crystal panel described above, the problems (1) and (3) particularly have to be solved. Therefore, it is necessary to enhance machining accuracy of the color combination optical system further.

The projection-type image display apparatus using the mirror-sequential system for color combination (FIG. 8) has the advantages that (1) the apparatus is relatively inexpensive and adapted easily to a large liquid crystal panel, (2) the apparatus can reduce the weight, and (3) in the absence of a relay optical system, the apparatus size can be relatively small and nonuniformity in brightness of the light source portion has little effect on projection images. However, there are problems as follows: (1) since a light beam passes through obliquely placed parallel planes, an astigmatic difference is caused, shifting the position of a focus on a vertical line from that on a horizontal line, which results in a blurred projection image; (2) it is difficult to provide flatness of the dichroic mirror surface formed on a thin glass sheet, which results in a blurred projection image; and (3) an increase in size of the color combination optical system 204 makes it difficult to achieve mechanical strength, to resist an external force such as vibration, and to maintain convergence accuracy. In particular, (1) and (2) are serious problems in promoting small size and high definition of a liquid crystal panel. Thus, the cross-prism system so far has gained mainstream use, though there remain the above problems to be solved.

SUMMARY OF THE INVENTION

It is an object of the present invention to provide a projection-type image display apparatus including a novel optical system that can overcome the above problems of various types of conventional optical systems, arising when the apparatus uses small-size high-definition liquid crystal panels.

To achieve the object, the present invention has the following configurations.

A first projection-type image display apparatus of the present invention includes the following: three light source portions for emitting red, green and blue light beams, respectively; a light valve portion for modulating each of the light beams from the light source portions; a color combination optical system for combining the light beams modulated by the light valve portion; and a projection lens for magnifying and projecting the combined light beam. The color combination optical system includes three triangular prisms, each of which has a vertex angle of about 30 degrees (preferably 27 to 33 degrees, more preferably 29 to 31 degrees, and most preferably 30 degrees), and is formed by joining the three prisms together so that the side faces of each prism that form the vertex angle are brought into contact to make the vertex angle of one prism next to that of the other prism. Each of the joining planes between the prisms is provided with a dichroic mirror surface acting as a color selection means. The side face of each prism opposite to the vertex angle is used as an incidence plane for each of the light beams. The side face of the prism arranged at one end of the three joined prisms is used as an exit plane for the combined light beam. The optical path lengths of the respective light beams between the incidence planes and the exit plane are substantially equal to one another.

Instead of the three light source portions, the present invention can employ a light source portion for emitting a white light beam. A second projection-type image display apparatus of the present invention includes the following: a light source portion for emitting a white light beam; a color separation optical system for separating the white light beam from the light source portion into red, green and blue light beams; a light valve portion for modulating each of the light beams from the color separation optical system; a color combination optical system for combining the light beams modulated by the light valve portion; and a projection lens for magnifying and projecting the combined light beam. The color combination optical system includes three triangular prisms, each of which has a vertex angle of about 30 degrees (preferably 27 to 33 degrees, more preferably 29 to 31 degrees, and most preferably 30 degrees), and is formed by joining the three prisms together so that the side faces of each prism that form the vertex angle are brought into contact to make the vertex angle of one prism next to that of the other prism. Each of the joining planes between the prisms is provided with a dichroic mirror surface acting as a color selection means. The side face of each prism opposite to the vertex angle is used as an incidence plane for each of the light beams. The side face of the prism arranged at one end of the three joined prisms is used as an exit plane for the combined light beam. The optical path lengths of the respective light beams between the incidence planes and the exit plane are substantially equal to one another.

According to the first and second configurations, the color combination optical system is formed as a prism block in which three prisms are joined together. This makes it possible to increase mechanical strength, to maintain durability, and to ensure accuracy even if an external force such as vibration is applied after convergence has been adjusted, thus providing an optical system with high reliability.

Moreover, all the reflection planes of the color combination optical system are the side faces of a single prism.

Therefore, this configuration can overcome such problems of the cross-prism system that a vertical line (shadow) appears on the center of a screen due to the interface between the prisms, color irregularity is caused by the difference in spectral characteristic between two prism surfaces that form one reflection plane, and defocus such as a double image occurs because the two prism surfaces are not flush with each other.

Unlike the cross-prism system, there is no need to align a surface of one prism with that of the other prism so as to form the same plane for joining. Thus, the cost can be reduced.

Unlike the mirror-sequential system, a chief ray does not pass thorough obliquely placed parallel planes. Therefore, images are not blurred. Since the dichroic mirror surface is formed on the side face of a prism, plane accuracy can be achieved easily and images are not blurred.

The distance between the light valve portion and the projection lens (i.e., a back focal length of the projection lens) can be minimized, thus reducing the size and cost of the projection lens.

The use of glass prisms allows the optical paths in the color combination optical system to be filled with glass, so that the optical path length can be made relatively short (specifically, though it may be longer than the optical path length in the cross-prism system, it is significantly shorter than that in the mirror-sequential system). Thus, the size of the apparatus can be reduced.

In the first and second apparatuses, it is preferable that the three prisms of the color combination optical system are first, second and third prisms that are joined in this order; a first dichroic mirror surface is provided at the joining plane between the first prism and the second prism, and a second dichroic mirror surface is provided at the joining plane between the second prism and the third prism; the exit plane is the side face of the third prism other than the joining plane and the incidence plane; a light beam entering the incidence plane of the first prism passes through the first prism, the first dichroic mirror surface, the second prism, the second dichroic mirror surface, and the third prism in sequence and exits from the exit plane; a light beam entering the incidence plane of the second prism passes through the second prism, is reflected from the first dichroic mirror surface to pass through the second prism again, passes through the second dichroic mirror surface and the third prism, and exits from the exit plane; and a light beam entering the incidence plane of the third prism passes through the third prism, is reflected from the side face including the exit plane to pass through the third prism again, is reflected from the second dichroic mirror surface to pass through the third prism yet again, and exits from the exit plane.

This preferred configuration can facilitate the combination of the three light beams and also make their optical path lengths equal.

In the preferred configuration, it is preferable that both the light beams entering the second and third prisms are s-polarized light with respect to the first and second dichroic mirror surfaces. Moreover, it is preferable that the light beam entering the first prism is p-polarized light with respect to the first and second dichroic mirror surfaces.

This preferred configuration can increase the utilization efficiency of light from the light source.

It is preferable that the light beam entering the first prism is a green light beam.

This preferred configuration can increase the utilization efficiency of light from the light source.

In the first and second apparatuses, it is preferable that the three prisms of the color combination optical system are of the same shape.

This preferred configuration can reduce the cost of the color combination optical system.

In the second apparatus, it is preferable that the light valve portion includes three light valves, one each for the respective light beams; the color separation optical system includes at least two dichroic mirrors and three reflection mirrors, the dichroic mirrors separating the white light beam from the light source portion into the red, green and blue light beams, and the reflection mirrors being arranged in accordance with the three light valves so as to guide the separated light beams to the corresponding light valves; and the optical path lengths of the three light beams between the light source portion and the light valves are substantially equal to one another.

Specifically, it is preferable that the three prisms of the color combination optical system are first, second and third prisms that are joined in this order; the exit plane is the side face of the third prism other than the plane joined to the second prism and the incidence plane; the light valve portion includes first, second and third light valves, one each for the respective light beams; the first, second and third light valves are arranged opposite to the incidence planes of the first, second and third prisms, respectively; the color separation optical system includes at least first and second dichroic mirrors and first, second and third reflection mirrors; the first dichroic mirror separates a third light beam from the white light beam emitted by the light source portion, and then the second dichroic mirror separates first and second light beams; the first light beam is reflected from the first reflection mirror, passes through the first light valve, and enters the incidence plane of the first prism; the second light beam is reflected from the second reflection mirror, passes through the second light valve, and enters the incidence plane of the second prism; the third light beam is reflected from the third reflection mirror, passes through the third light valve, and enters the incidence plane of the third prism; and the optical path lengths of the three light beams between the light source portion and the light valves are substantially equal to one another.

According to this preferred configuration, the color separation optical system does not require a relay optical system. Therefore, the size and cost of the apparatus can be reduced. Moreover, the optical path lengths of the three light beams between the light source portion and the respective light valves are substantially equal to one another. Thus, this configuration does not cause the problem of color irregularity resulting from a reverse of the light source image due to a difference in the optical path lengths, which arises along with the use of a relay optical system. Consequently, high image quality can be achieved.

In the above preferred configuration, the optical axis that goes through the first dichroic mirror and the first reflection mirror may be substantially orthogonal to the optical axis that goes through the first reflection mirror and the exit plane, and thus a chief ray of the white light beam can enter the first dichroic mirror at the angle of incidence smaller than 45 degrees.

Alternately, the optical axis that goes through the first dichroic mirror and the third reflection mirror may be substantially parallel to the optical axis that goes through the first reflection mirror and the exit plane, and thus a chief ray of the white light beam can enter the first dichroic mirror at the angle of incidence larger than 45 degrees.

In the first and second apparatuses, it is preferable that light emitted from the light source portion is polarized light having a uniform polarization direction.

This preferred configuration can improve the utilization efficiency of light from the light source portion. When a liquid crystal light valve is used in the light valve portion, this configuration can reduce optical absorption by an entrance polarizing plate.

In the first and second apparatuses, it is preferable that the light valve portion includes three light valve units, one each for the respective light beams, and each of the light valve units includes at least an entrance polarizing plate as a polarizer, a transmission-type liquid crystal panel, and an exit polarizing plate as an analyzer.

This preferred configuration can form images with a simple structure.

In the first and second apparatuses, it is preferable that the base of each of the triangular prisms is a right triangle.

This preferred configuration can make the optical path lengths of the respective light beams in the color combination optical system equal.

DETAILED DESCRIPTION OF THE INVENTION

Embodiment 1

Figure 1:
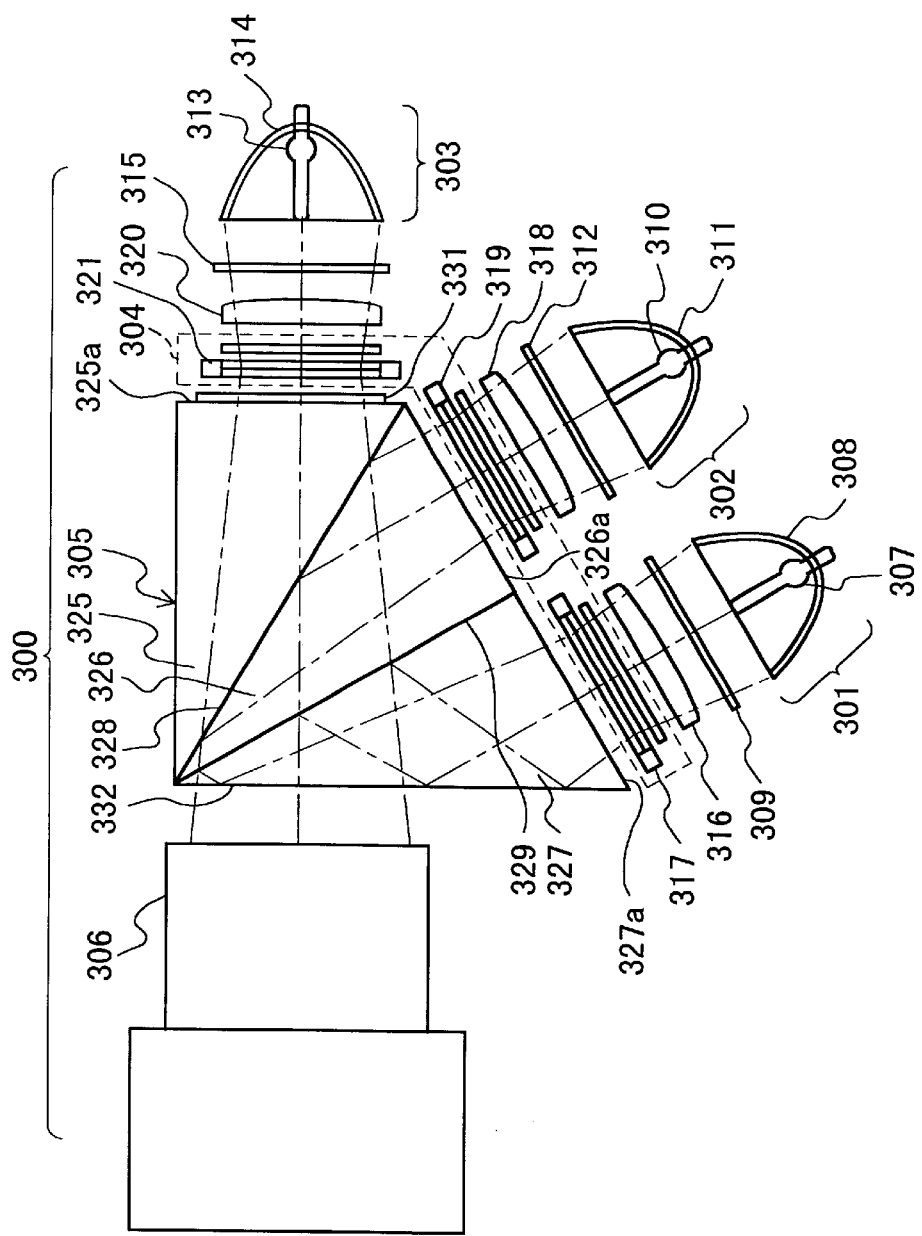
FIG. 1 is a schematic view showing the configuration of a projection-type image display apparatus according to Embodiment 1 of the present invention.

FIG. 1 is a schematic view showing the configuration of a projection-type image display apparatus according to Embodiment 1 of the present invention.

A projection-type image display apparatus 300 of this embodiment includes a red light source portion 301, a blue light source portion 302, a green light source portion 303, a light valve portion 304, a color combination optical system 305, and a projection optical system (a projection lens) 306.

The red light source portion 301 includes a light source 307, a reflector 308, and a red-transmission dichroic filter 309. The light source 307 forms an arc by discharge between electrodes to generate a randomly polarized white light beam. The reflector 308 reflects the light beam from the light source 307 in one direction along its axis of rotational symmetry. The red-transmission dichroic filter 309 is located ahead of the opening of the reflector 308.

The blue light source portion 302 includes a light source 310, a reflector 311, and a blue-transmission dichroic filter 312. The light source 310 forms an arc by discharge between electrodes to generate a randomly polarized white light beam. The reflector 311 reflects the light beam from the light source 310 in one direction along its axis of rotational symmetry. The blue-transmission dichroic filter 312 is located ahead of the opening of the reflector 311.

The green light source portion 303 includes a light source 313, a reflector 314, and a green-transmission dichroic filter 315. The light source 313 forms an arc by discharge between electrodes to generate a randomly polarized white light beam. The reflector 314 reflects the light beam from the light source 313 in one direction along its axis of rotational symmetry. The green-transmission dichroic filter 315 is located ahead of the opening of the reflector 314.

A red light beam from the red light source portion 301 passes through a condenser lens 316 into a red light valve unit 317. A blue light beam from the blue light source portion 302 passes through a condenser lens 318 into a blue light valve unit 319. A green light beam from the green light source portion 303 passes through a condenser lens 320 into a green light valve unit 321.

Figure 2:
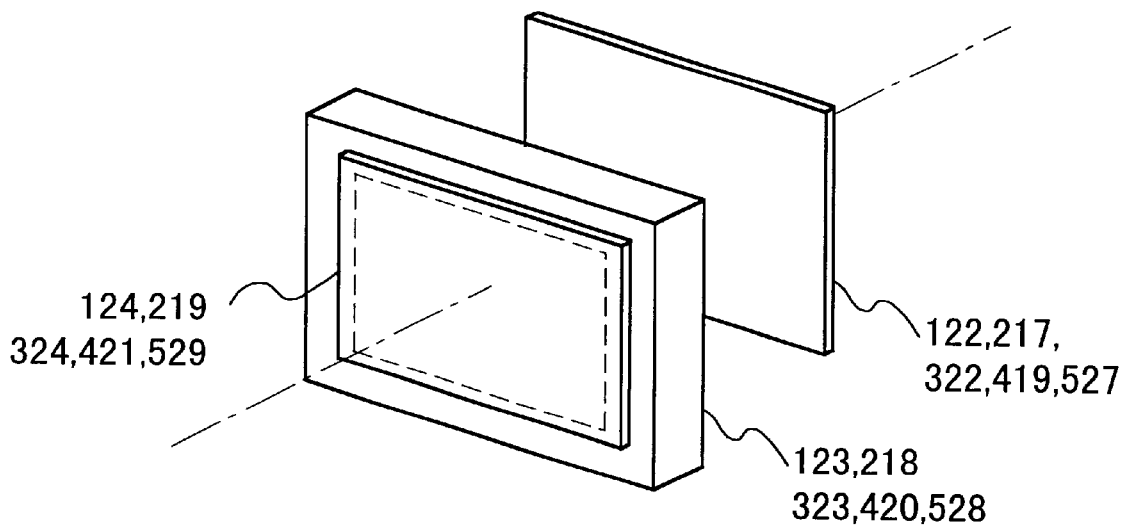
FIG. 2 is a perspective view showing the schematic configuration of a light valve unit used in a projection-type image display apparatus of the present invention.

The light valve portion 304 includes the red, blue and green light valve units 317, 319 and 321, which are arranged in accordance with the respective light beams. Each of the light valve units 317, 319 and 321 includes an entrance polarizing plate 322, a liquid crystal panel 323, and an exit polarizing plate 324, as shown in FIG. 2. The entrance polarizing plate 322 is rectangular in shape and designed, e.g., to transmit light polarized in the short side direction and to absorb light polarized in the direction perpendicular thereto. The light beam passing through the entrance polarizing plate 322 enters the liquid crystal panel 323. The liquid crystal panel 323 has many pixels arranged in the form of an array and can change the polarization direction of the incident light at each pixel aperture with an external signal. In this embodiment, when the pixels are not driven, the liquid crystal panel 323 transmits the incident light while rotating its polarization direction by 90 degrees; when the pixels are driven, the liquid crystal panel 323 transmits the incident light without changing its polarization direction. The exit polarizing plate 324 has polarization characteristics in the direction perpendicular to the entrance polarizing plate 322. In other words, the exit polarizing plate 324 has a transmission axis in the long side direction of its rectangular outline and transmits light polarized in this direction. Therefore, the light beam that has entered the undriven pixel of the liquid crystal panel 323 and been transmitted with its polarization direction rotated by 90 degrees can pass through the exit polarizing plate 324 because it is polarized in the direction parallel to the transmission axis. On the other hand, the light beam that has entered the driven pixel of the liquid crystal panel 323 and been transmitted with its polarization direction unchanged is absorbed by the exit polarizing plate 324 because it is polarized in the direction perpendicular to the transmission axis.

The light beams thus transmitted through the light valve portion 304 enter the color combination optical system 305.

The color combination optical system 305 is formed by joining three triangular prisms (i.e., a first prism 325, a second prism 326 and a third prism 327) together. The three prisms are of the same shape, and the base of each prism is a right triangle having an interior angle of 30 degrees (hereinafter, referred to as a vertex angle). As shown in FIG. 1, the three prisms 325, 326 and 327 are joined in this order so that their vertex angles are next to each other. The side faces 325a, 326a and 327a opposite to the vertex angles of the first, second, and third prisms 325, 326 and 327 are opposite to the light valve units 321, 319 and 317, respectively. A blue-reflection dichroic mirror coated surface (a first dichroic mirror surface) 328 is formed at the joining plane between the first prism 325 and the second prism 326. Similarly, a red-reflection dichroic mirror coated surface (a second dichroic mirror surface) 329 is formed at the joining plane between the second prism 326 and the third prism 327. The incidence plane 325a for the green light beam (i.e., the side face of the first prism 325 opposite to the green light valve unit 321) is provided with a $\lambda/2$ phase-difference plate 331.

The green light beam emitted from the green light valve unit 321 passes through the $\lambda/2$ phase-difference plate 331, where its polarization direction is twisted by 90 degrees. The green light beam thus twisted is p-polarized light with respect to the blue- and red-reflection dichroic mirror coated surfaces 328, 329. The green light beam enters the side face 325a (a first incidence plane) of the first prism 325, passes through the first prism 325, the blue-reflection dichroic mirror coated surface 328, the second prism 326, the red-reflection dichroic mirror coated surface 329, the third prism 327, and the side face of the third prism (an exit plane 332) in sequence, and enters the projection lens 306, which acts as a projection optical system.

The blue light beam emitted from the blue light valve unit 319 is s-polarized light with respect to the blue- and red-reflection dichroic mirror coated surfaces 328, 329. The blue light beam enters the side face 326a (a second incidence plane) of the second prism 326, passes through the second prism 326, and is reflected from the blue-reflection dichroic mirror coated surface 328 to pass through the second prism 326 again. Then, it passes through the red-reflection dichroic mirror coated surface 329, the third prism 327, and the exit plane 332 and enters the projection lens 306.

The red light beam emitted from the red light valve unit 317 is s-polarized light with respect to the blue- and red-reflection dichroic mirror coated surface 328, 329. The red light beam enters the side face 327a (a third incidence plane) of the third prism 327, passes through the third prism 327, and is reflected totally from the side face including the exit plane 332 to pass through the third prism 327 again. Then, it is reflected from the red-reflection dichroic mirror coated surface 329 to pass though the third prism 327 yet again, passes through the exit plane 332, and enters the projection lens 306.

The projection lens 306 magnifies and projects the incident light onto a screen (not shown). Consequently, images of three light beams, each of which is formed by the light valve units 317, 319 and 321, are combined and displayed as a color image.

According to this embodiment, the color combination optical system 305 includes three prisms 325, 326 and 327 that are joined together in the form of a block. This makes it easy to ensure strength and durability, so that the accuracy can be kept high without any deviation after the convergence has been adjusted. Therefore, images with high quality can be displayed for a long period of time.

Since the optical paths are filled with glass, the optical path length can be made relatively short (specifically, it can be reduced by two thirds of the optical path length measured when air is used instead of glass). Also, a relay optical system, which is required for the cross-prism system, is not necessary, thus contributing to a reduction in size of the apparatus.

Moreover, all the reflection planes of the color combination optical system 305 are the side faces of a single prism. Therefore, a favorable focus can be achieved. In addition, this embodiment can overcome such problems of the cross-prism system that a shadow appears due to the interface between the prisms and color irregularity is caused by the difference in spectral characteristic between two prism surfaces that form one reflection plane. Thus, it is possible to provide images with enhanced uniformity. The color combination optical system 305 can be formed basically by joining three prisms having the same shape. Unlike the cross-prism system, there is no need to align a surface of one prism with that of the other prism for joining. Accordingly, this embodiment has advantages over the conventional cross-prism system also due to its lower cost.

In Embodiment 1, the optical path lengths between the projection lens 306 and each of the light valve units 317, 319 and 321 are substantially equal for the respective light beams. Similarly, the optical path lengths between each of the light valve units 317, 319 and 321 and the corresponding light source portions 301, 302 and 303 are substantially equal for the respective light beams. Therefore, unlike the cross-prism system using a relay optical system, this embodiment does not cause a reverse of the light source image of a specific light beam. Thus, it is easy to achieve high image quality.

The convergence adjustment for combining projection images of the respective light beams is performed generally in the following manner: a light valve unit for one color is fixed, and the remaining light valve units for the other two colors are adjusted so as to match with the image formed by the fixed light valve unit. In this embodiment, it is preferable that the red and green light valve units 317, 321 on both sides of the blue light valve unit 319 are adjusted, while the blue light valve unit 319 in the center is fixed. This can facilitate adjustment and minimize the adjustment tolerance of the light valve units 317, 321.

This embodiment uses a liquid crystal panel having a polarization effect as a light valve. However, note that the present invention is not limited thereto, and can employ an image display element that displays images without relying on polarization. As will be described later, when dichroic mirrors are provided in the color combination optical system, the band of each light beam can be set without causing color mixture if those dichroic mirrors transmit p-polarized light for a green light beam and reflect s-polarized light for blue and red light beams, so that it is desirable to use light valves that utilize polarization. In this case, a polarization direction converting optical system (see FIG. 6) can be used in the light source portion in Embodiment 1, thereby increasing the utilization efficiency of light from the light source. The polarization direction converting optical system, which will be described in Embodiment 3, can convert randomly polarized light into polarized light having a uniform polarization direction.

It is preferable that s-polarized light instead of p-polarized light should enter the prisms in the color combination optical system 305 so as to ensure the reflectance of any color light beam with respect to the dichroic mirrors, i.e., a color selection means, in the entire range of bands. For this reason, in the above example, a blue light beam is s-polarized light with respect to the blue-reflection dichroic mirror coated surface (the first dichroic mirror surface) 328, and a red light beam also is s-polarized light with respect to the red-reflection dichroic mirror coated surface (the second dichroic mirror surface) 329.

The color combination optical system of this embodiment is formed so that a green light beam passes through all the dichroic mirrors. The spectral characteristic of the blue-reflection dichroic mirror is shifted to a longer wavelength region for s-polarized light than for p-polarized light, and the spectral characteristic of the red-reflection dichroic mirror is shifted to a shorter wavelength region for s-polarized light than for p-polarized light. Therefore, it is advantageous that the color combination optical system receives the blue and red light beams as s-polarized light and the green light beam as p-polarized light because a wide range of spectral bands of the dichroic mirrors can be ensured.

In the optical system shown in FIG. 1, the optical path of a red light beam can be replaced with that of a blue light beam.

Each of the light source portions 301, 302 and 303 as described above provides a desired color of light by using a filter to select the color from a white light beam emitted from a discharge tube. However, the present invention is not limited thereto. For example, no filter is needed if a discharge tube having spectral distribution suitable for each color of light is used. Note that in addition to the discharge tube, a laser, an electroluminescence (EL), or the like can be used as a light source.

Embodiment 2

Figure 3:
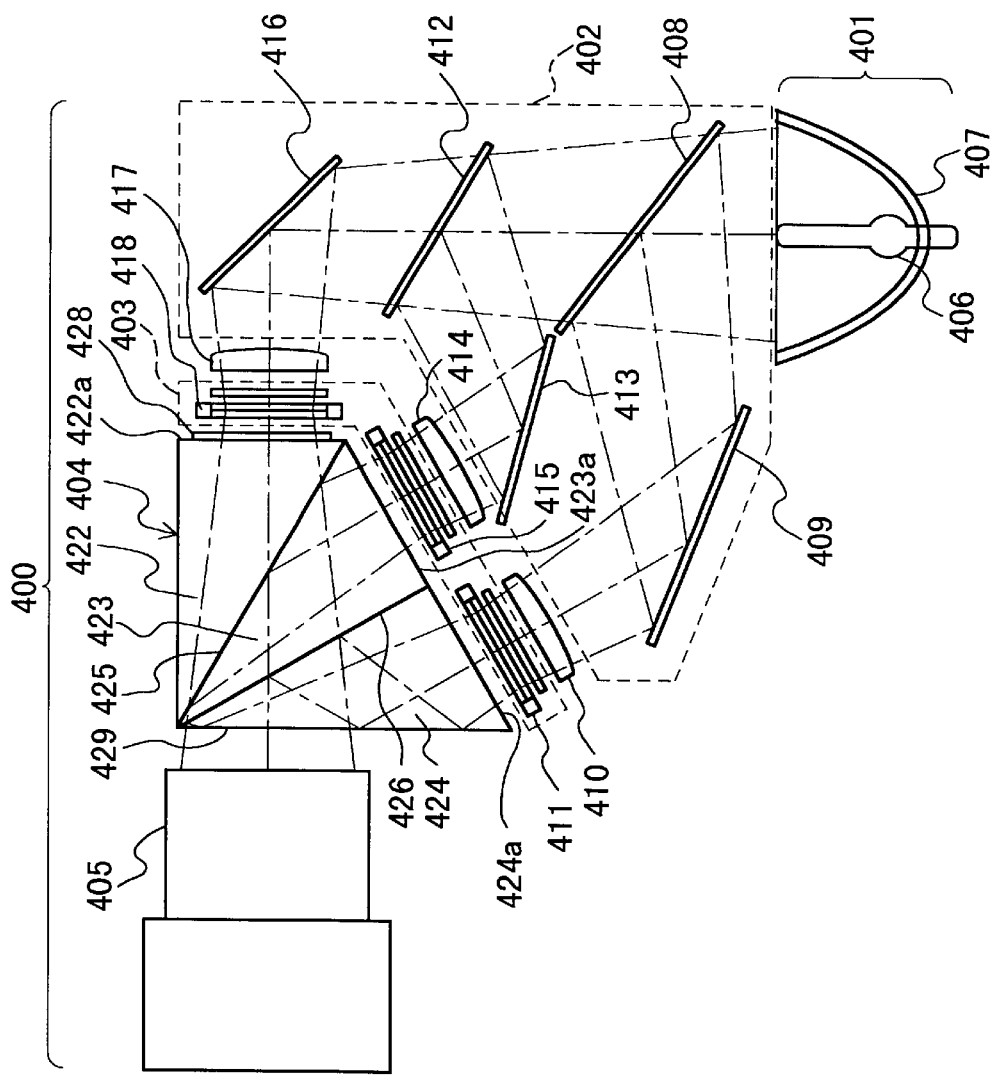
FIG. 3 is a schematic view showing the configuration of a projection-type image display apparatus according to Embodiment 2 of the present invention.

FIG. 3 is a schematic view showing the configuration of a projection-type image display apparatus according to Embodiment 2 of the present invention.

A projection-type image display apparatus 400 of this embodiment includes a light source portion 401, a color separation optical system 402, a light valve portion 403, a color combination optical system 404, and a projection optical system (a projection lens) 405.

The light source portion 401 includes a light source 406 and a reflector 407. The light source 406 forms an arc by discharge between electrodes to generate a randomly polarized white light beam. The reflector 407 reflects the light beam from the light source 406 in one direction along its axis of rotational symmetry.

A light beam from the light source portion 401 enters a blue-reflection dichroic mirror (a first dichroic mirror) 408 of the color separation optical system 402, where a blue light beam (a third light beam) of the incident white light beam is reflected. Then, the blue light beam is reflected further from a reflection mirror (a third reflection mirror) 409 and passes through a condenser lens 410 into a blue light valve unit (a third light valve) 411.

Green and red light beams of the incident white light beam are transmitted by the blue-reflection dichroic mirror 408 and enter a red-reflection dichroic mirror (a second dichroic mirror) 412, where the red light beam (a second light beam) is reflected. Then, the red light beam is reflected further from a reflection mirror (a second reflection mirror) 413 and passes through a condenser lens 414 into a red light valve unit (a second light valve) 415.

The green light beam (a first light beam) is transmitted by the red-reflection dichroic mirror 412, reflected from a reflection mirror (a first reflection mirror) 416, and passes through a condenser lens 417 into a green light valve unit (a first light valve) 418.

The light valve portion 403 includes the blue, red and green light valve units 411, 415 and 418, which are arranged in accordance with the respective light beams. Each of the light valve units 411, 415 and 418 includes an entrance polarizing plate 419, a liquid crystal panel 420, and an exit polarizing plate 421, as shown in FIG. 2. The entrance polarizing plate 419 is rectangular in shape and designed, e.g., to transmit light polarized in the short side direction and to absorb light polarized in the direction perpendicular thereto. The light beam passing through the entrance polarizing plate 419 enters the liquid crystal panel 420. The liquid crystal panel 420 has many pixels arranged in the form of an array and can change the polarization direction of the transmitted light at each pixel aperture with an external signal. In this embodiment, when the pixels are not driven, the liquid crystal panel 420 transmits the incident light while rotating its polarization direction by 90 degrees; when the pixels are driven, the liquid crystal panel 420 transmits the incident light without changing its polarization direction. The exit polarizing plate 421 has polarization characteristics in the direction perpendicular to the entrance polarizing plate 419. In other words, the exit polarizing plate 421 has a transmission axis in the long side direction of its rectangular outline and transmits light polarized in this direction. Therefore, the light beam that has entered the undriven pixel of the liquid crystal panel 420 and been transmitted with its polarization direction rotated by 90 degrees can pass through the exit polarizing plate 421 because it is polarized in the direction parallel to the transmission axis. On the other hand, the light that has entered the driven pixel of the liquid crystal panel 420 and been transmitted with its polarization direction unchanged is absorbed by the exit polarizing plate 421 because it is polarized in the direction perpendicular to the transmission axis.

The light beams thus transmitted through the light valve portion 403 enter the color combination optical system 404.

The color combination optical system 404 is formed by joining three triangular prisms (i.e., a first prism 422, a second prism 423 and a third prism 424) together. The three prisms are of the same shape, and the base of each prism is a right triangle having an interior angle of 30 degrees (hereinafter, referred to as a vertex angle). As shown in FIG. 3, the three prisms 422, 423 and 424 are joined in this order so that their vertex angles are next to each other. The side faces 422a, 423a and 424a opposite to the vertex angles of the first, second and third prisms 422, 423 and 424 are opposite to the light valve units 418, 415 and 411, respectively. A red-reflection dichroic mirror coated surface (a first dichroic mirror surface) 425 is formed at the joining plane between the first prism 422 and the second prism 423. Similarly, a blue-reflection dichroic mirror coated surface (a second dichroic mirror surface) 426 is formed at the joining plane between the second prism 423 and the third prism 424. The incidence plane 422a for the green light beam (i.e., the side face of the first prism 422 opposite to the green light valve unit 418) is provided with a λ/2 phase-difference plate 428.

The green light beam emitted from the green light valve unit (the first light valve) 418 passes through the λ/2 phase-difference plate 428, where its polarization direction is twisted by 90 degrees. The green light beam thus twisted is p-polarized light with respect to the red- and blue-reflection dichroic mirror coated surfaces 425, 426. The green light beam enters the side face 422a (a first incidence plane) of the first prism 422, passes through the first prism 422, the red-reflection dichroic mirror coated surface 425, the second prism 423, the blue-reflection dichroic mirror coated surface 426, the third prism 424, and the side face of the third prism (an exit plane 429) in sequence, and enters the projection lens 405, which acts as a projection optical system.

The red light beam emitted from the red light valve unit (the second light valve) 415 is s-polarized light with respect to the red- and blue-reflection dichroic mirror coated surfaces 425, 426. The red light beam enters the side face 423a (a second incidence plane) of the second prism 423, passes through the second prism 423, and is reflected from the red-reflection dichroic mirror coated surface 425 to pass through the second prism 423 again. Then, it passes through the blue-reflection dichroic mirror coated surface 426, the third prism 424, and the exit plane 429 and enters the projection lens 405.

The blue light beam emitted from the blue light valve unit (the third light valve) 411 is s-polarized light with respect to the red- and blue-reflection dichroic mirror coated surfaces 425, 426. The blue light beam enters the side face 424a (a third incidence plane) of the third prism 424, passes through the third prism 424, and is reflected totally from the side face including the exit plane 429 to pass through the third prism 424 again. Then, it is reflected from the blue-reflection dichroic mirror coated surface 426 to pass through the third prism 424 yet again, passes through the exit plane 429, and enters the projection lens 405.

The projection lens 405 magnifies and projects the incident light onto a screen (not shown). Consequently, images of three light beams, each of which is formed by the light valve units 411, 415 and 418, are combined and displayed as a color image.

According to this embodiment, the color combination optical system 404 includes three prisms 422, 423 and 424 that are joined together in the form of a block. This makes it easy to ensure strength and durability, so that the accuracy can be kept high without any deviation after the convergence has been adjusted. Therefore, images with high quality can be displayed for a long period of time.

Since the optical paths are filled with glass, the optical path length can be made relatively short (specifically, it can be reduced by two thirds of the optical path length measured when air is used instead of glass). Also, a relay optical system, which is required for the cross-prism system, is not necessary, thus contributing to a reduction in size of the apparatus.

Moreover, all the reflection planes of the color combination optical system 404 are the side faces of a single prism. Therefore, a favorable focus can be achieved. In addition, this embodiment can overcome such problems of the cross-prism system that a shadow appears due to the interface between the prisms and color irregularity is caused by the difference in spectral characteristic between two prism surfaces that form one reflection plane. Thus, it is possible to provide images with enhanced uniformity. The color combination optical system 404 can be formed basically by joining three prisms having the same shape. Unlike the cross-prism system, there is no need to align a surface of one prism with that of the other prism for joining. Accordingly, this embodiment has advantages over the conventional cross-prism system also due to its lower cost.

Since the color separation optical system 402 does not include a relay optical system, the whole size and cost of the apparatus can be reduced. Also, this can prevent color irregularity caused by reversing of the light source image in the relay optical system.

In Embodiment 2, the optical path lengths between the light source portion 401 and each of the light valve units 411, 415 and 418 are equal for the respective light beams. Similarly, the optical path lengths between the projection lens 405 and each of the light valve units 411, 415 and 418 are substantially equal for the respective light beams.

In Embodiment 2, the optical systems are formed so that the optical axis that goes through the blue-reflection dichroic mirror (the first dichroic mirror) 408 and the reflection mirror (the first reflection mirror) 416 is substantially orthogonal to the optical axis that goes through the exit plane 429 and the reflection mirror 416. This makes it possible to reduce the size of the apparatus in the direction parallel to the projection direction. Moreover, a chief ray from the light source 406 enters the blue-reflection dichroic mirror 408 at the angle of incidence smaller than 45 degrees, and thus the optical path lengths of the respective light beams are set to be equal in the color separation optical system 402.

Figure 4:
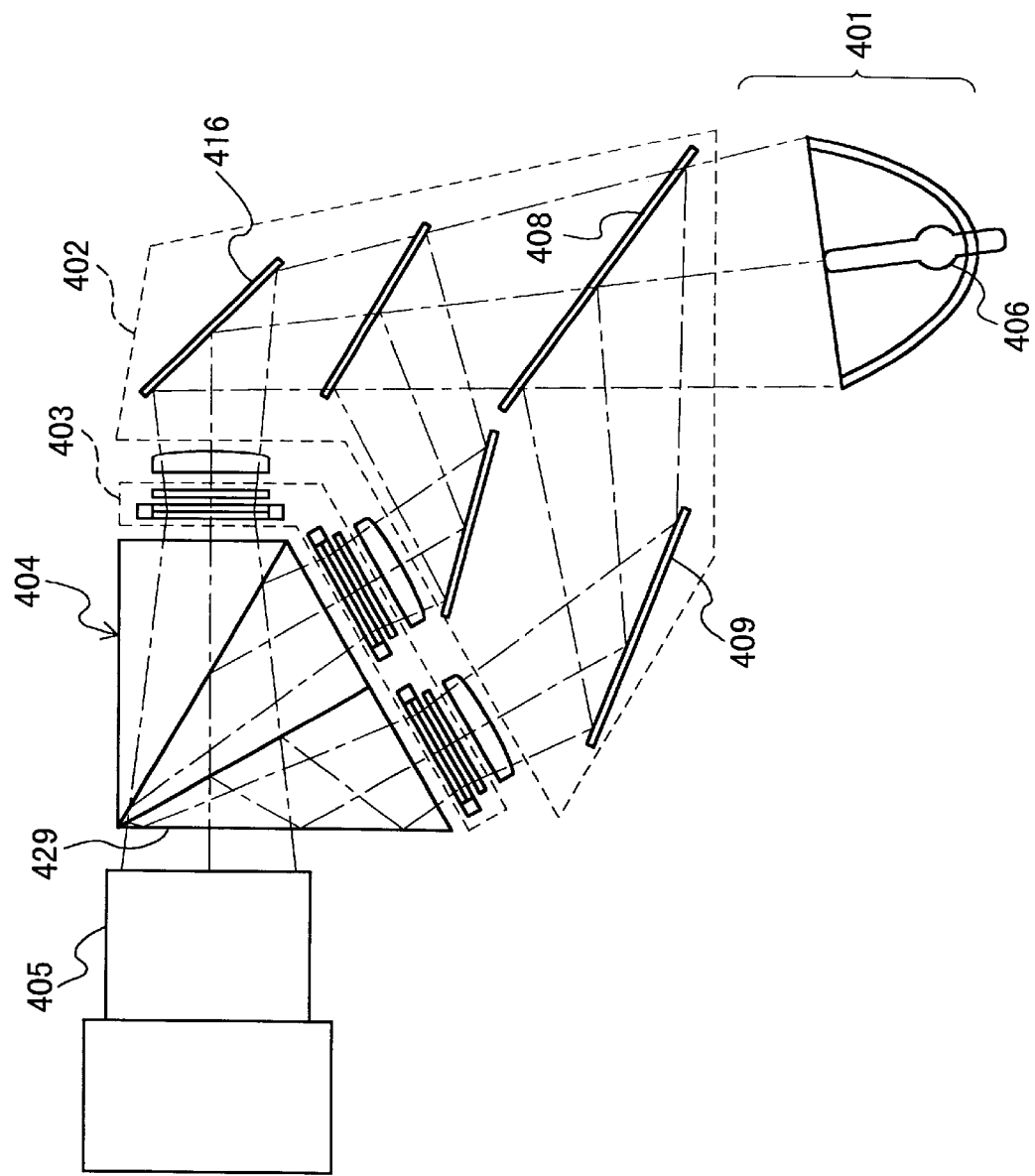
FIG. 4 is a schematic view showing another configuration of a projection-type image display apparatus according to Embodiment 2 of the present invention.

As shown in FIG. 4, the optical systems may be formed so that the optical axis that goes through the blue-reflection dichroic mirror 408 and the reflection mirror (the third reflection mirror) 409 is substantially parallel to the optical axis that goes through the exit plane 429 and the reflection mirror 416, and a chief ray from the light source 406 enters the blue-reflection dichroic mirror 408 at the angle of incidence larger than 45 degrees, like Embodiment 3 to be described later, instead of making the optical axis through the blue-reflection dichroic mirror 408 and the reflection mirror 416 and the optical axis through the exit plane 429 and the reflection mirror 416 cross at right angles. This configuration also allows the optical path lengths between the light source 406 and each of the light valve units 411, 415 and 418 to be equal for the respective light beams.

The convergence adjustment for combining projection images of the respective light beams is performed generally in the following manner: a light valve unit for one color is fixed, and the remaining light valve units for the other two colors are adjusted so as to match with the image formed by the fixed light valve unit. In this embodiment, it is preferable that the blue and green light valve units 411, 418 on both sides of the red light valve unit 415 are adjusted, while the red light valve unit 415 in the center is fixed. This can facilitate adjustment and minimize the adjustment tolerance of the light valve units 411, 418.

This embodiment uses a liquid crystal panel having a polarization effect as a light valve. However, note that the present invention is not limited thereto, and can employ an image display element that displays images without relying on polarization. As will be described later, when dichroic mirrors are provided in the color combination optical system, the band of each light beam can be set without causing color mixture if those dichroic mirrors transmit p-polarized light for a green light beam and reflect s-polarized light for blue and red light beams, so that it is desirable to use light valves that utilize polarization. In this case, a polarization direction converting optical system (see FIG. 6) can be used in the light source portion in Embodiment 2, thereby increasing the utilization efficiency of light from the light source. The polarization direction converting optical system, which will be described in Embodiment 3, can convert randomly polarized light into polarized light having a uniform polarization direction.

It is preferable that, like Embodiment 1, s-polarized light instead of p-polarized light should enter the prisms in the color combination optical system 404 so as to ensure the reflectance of any color light beam with respect to the dichroic mirrors, i.e., a color selection means, in the entire range of bands. For this reason, in the above example, a blue light beam is s-polarized light with respect to the blue-reflection dichroic mirror coated surface (the second dichroic mirror surface) 426, and a red light beam also is s-polarized light with respect to the red-reflection dichroic mirror coated surface (the first dichroic mirror surface) 425.

The color combination optical system of this embodiment is formed so that a green light beam passes through all the dichroic mirrors. The spectral characteristic of the blue-reflection dichroic mirror is shifted to a longer wavelength region for s-polarized light than for p-polarized light, and the spectral characteristic of the red-reflection dichroic mirror is shifted to a shorter wavelength region for s-polarized light than for p-polarized light. Therefore, it is advantageous that the color combination optical system receives the blue and red light beams as s-polarized light and the green light beam as p-polarized light because a wide range of spectral bands of the dichroic mirrors can be ensured.

In the optical systems shown in FIGS. 3 and 4, the optical path of a red light beam can be replaced with that of a blue light beam.

Embodiment 3

Figure 5:
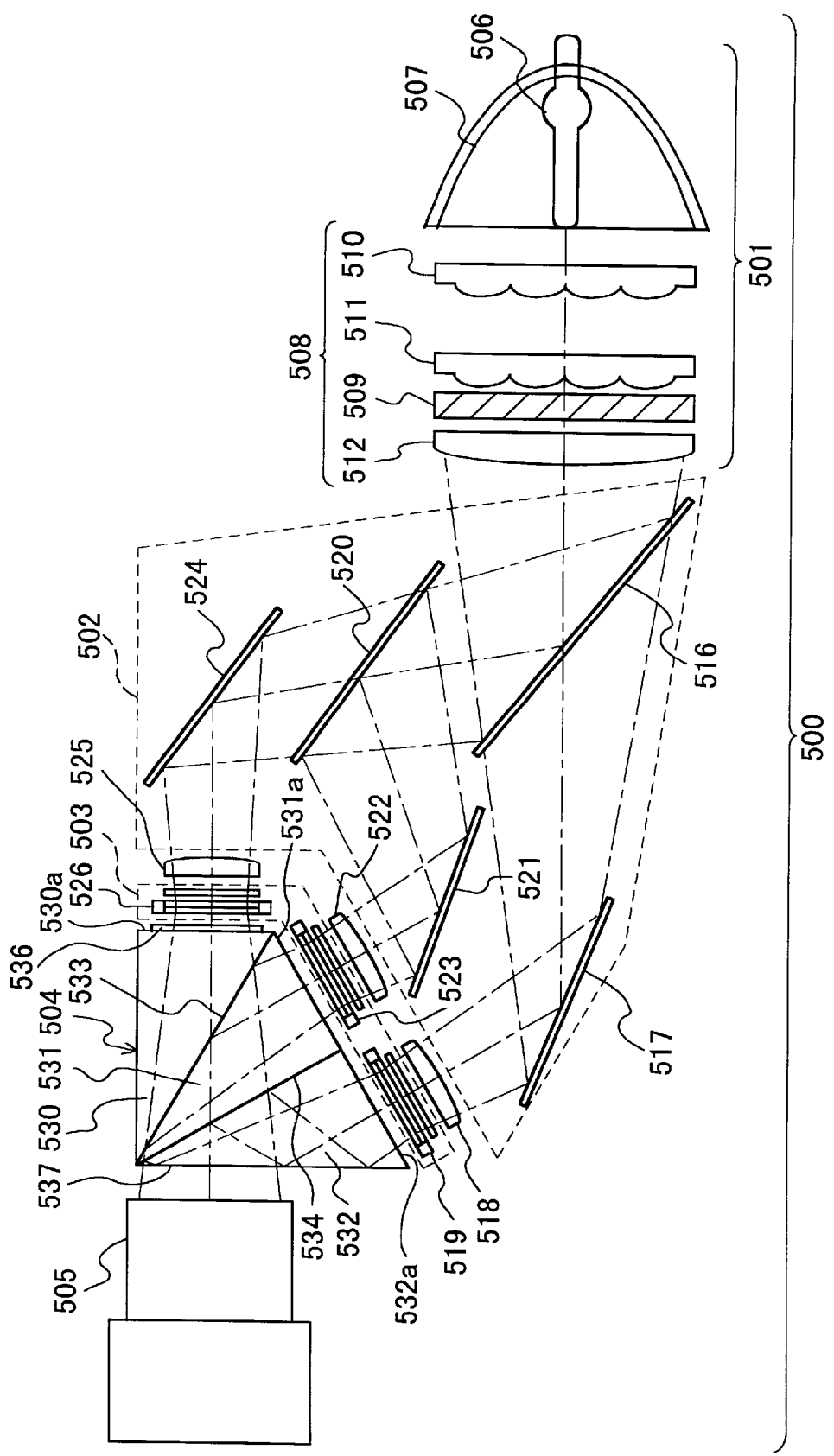
FIG. 5 is a schematic view showing the configuration of a projection-type image display apparatus according to Embodiment 3 of the present invention.

FIG. 5 is a schematic view showing the configuration of a projection-type image display apparatus according to Embodiment 3 of the present invention.

A projection-type image display apparatus 500 of this embodiment includes a light source portion 501, a color separation optical system 502, a light valve portion 503, a color combination optical system 504, and a projection optical system (a projection lens) 505.

The light source portion 501 includes a light source 506, a reflector 507, an integrator optical system 508, and a polarization direction converting optical system 509. The light source 506 forms an arc by discharge between electrodes to generate a randomly polarized white light beam. The reflector 507 reflects the light beam from the light source 506 in one direction along its axis of rotational symmetry. The integrator optical system 508 guides the light beam uniformly from the light source to light valves. The polarization direction converting optical system 509 is provided in the integrator optical system 508 so as to convert the randomly polarized light from the light source into polarized light having a uniform polarization direction.

Generally, the integrator optical system 508 includes a first lens array 510, a second lens array 511 and a condenser lens 512. The first lens array 510 includes many microlenses arranged closely together on the same plane, each of which has a shape substantially similar to that of the light valve aperture. The second lens array 511 is the same as the first lens array 510 in shape. The integrator optical system 508 superimposes images of the microlenses on the first lens array 510 onto the light valve, enabling uniform illumination.

Figure 6:
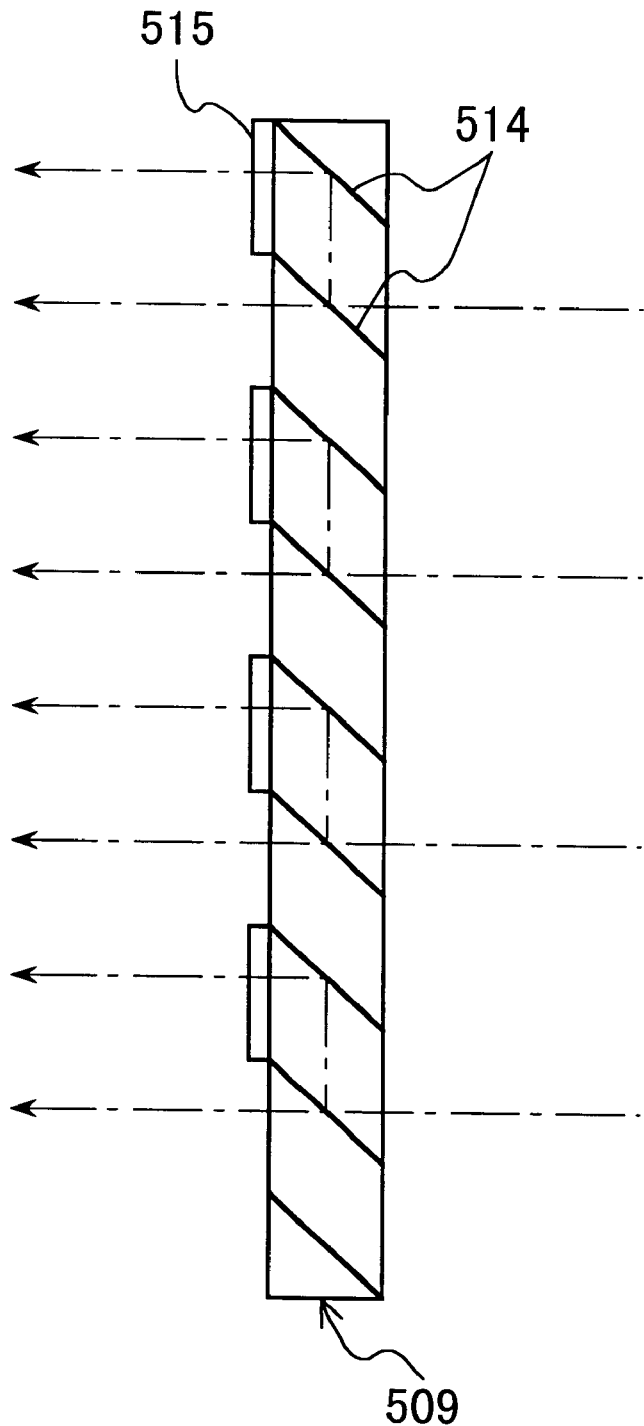
FIG. 6 shows the configuration of a polarization direction converting optical system used in a projection-type image display apparatus according to Embodiment 3 of the present invention.
Figure 7:
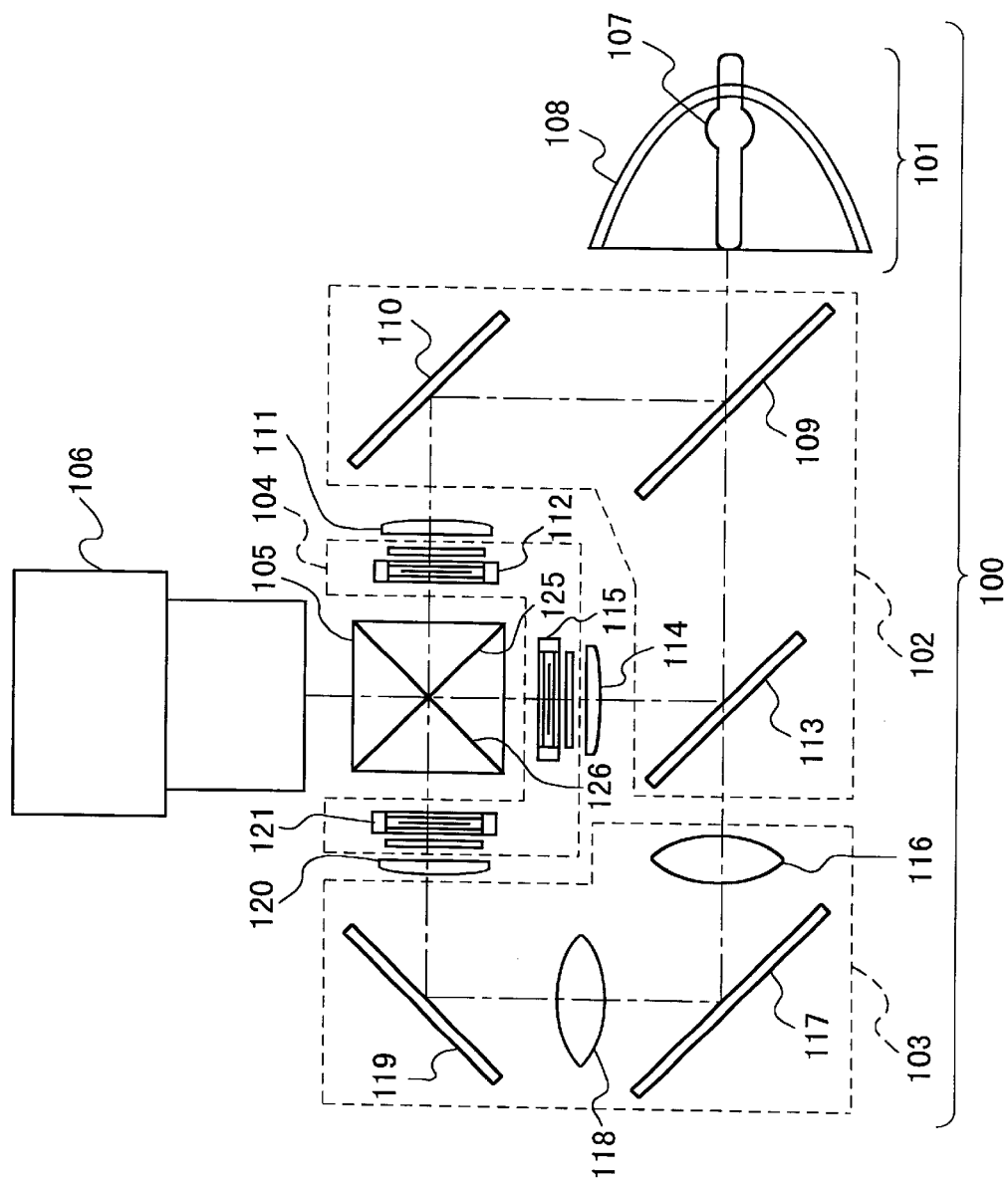
FIG. 7 is a schematic view showing the configuration of a conventional cross-prism projection-type image display apparatus.
Figure 8:
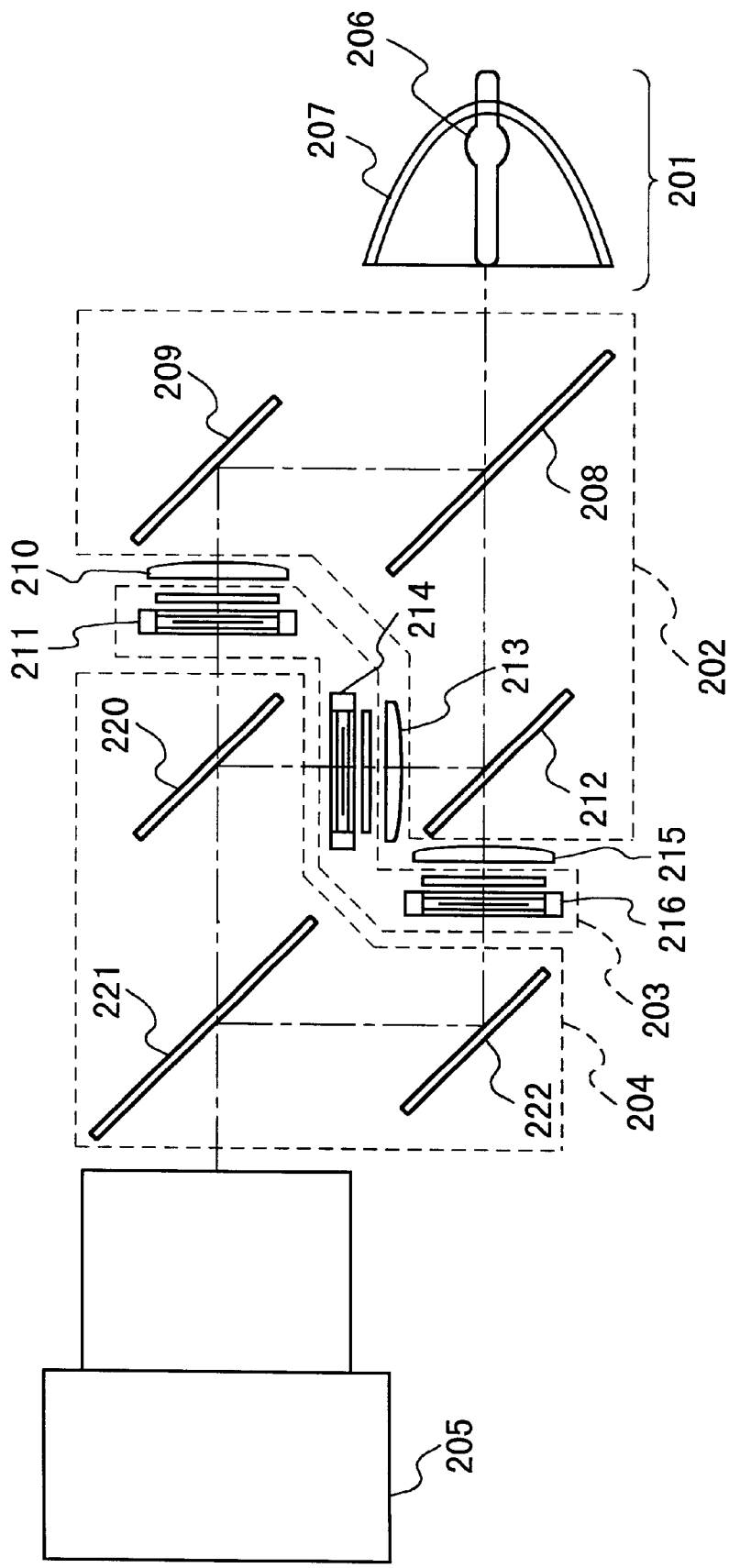
FIG. 8 is a schematic view showing the configuration of a conventional mirror-sequential projection-type image display apparatus.

The polarization direction converting optical system 509 is a group of quadratic prisms arranged in one direction, each of which has a parallelogrammic base, as shown in FIG. 6. A polarizing beam splitter film 514 is provided at each of the interfaces (i.e., joining planes) between adjacent prisms that are placed obliquely with respect to the incident light. The polarizing beam splitter film 514 separates the incident light according to the polarization direction. Polarization direction converting elements 515 (the $\lambda/2$ phase-difference plates may be used instead) are provided for every other prism on the side of the exit plane. The polarization direction converting element has the function of emitting the incident light while rotating its polarization direction by 90 degrees. A light beam from the light source passes through the prism and enters the polarizing beam splitter film 514, where p-polarized light of the incident light is transmitted and s-polarized light is reflected. The reflected light beam passes through the prism into the next polarizing beam splitter film 514, is reflected therefrom again, and enters the polarization direction converting element 515, which is provided partially on the prism exit plane. The polarization direction converting element 515 transmits the incident light while rotating its polarization direction by 90 degrees. In this manner, the polarization direction converting optical system 509 converts the incident light into s-polarized light to be emitted.

The polarized light beam thus emitted from the light source portion 501 enters a blue-transmission dichroic mirror (a first dichroic mirror) 516 of the color separation optical system 502, where a blue light beam (a third light beam) of the incident white light beam is transmitted. Then, the blue light beam is reflected from a reflection mirror (a third reflection mirror) 517 and passes through a condenser lens 518 into a blue light valve unit (a third light valve) 519.

Green and red light beams of the incident white light beam are reflected from the blue-transmission dichroic mirror 516 and enter a red-reflection dichroic mirror (a second dichroic mirror) 520, where the red light beam (a second light beam) is reflected. Then, the red light beam is reflected further from a reflection mirror (a second reflection mirror) 521 and passes through a condenser lens 522 into a red light valve unit (a second light valve) 523.

The green light beam (a first light beam) is transmitted by the red-reflection dichroic mirror 520, reflected from a reflection mirror (a first reflection mirror) 524, and passes through a condenser lens 525 into a green light valve unit (a first light valve) 526.

The light valve portion 503 includes the blue, red and green light valve units 519, 523 and 526, which are arranged in accordance with the respective light beams. Each of the light valve units 519, 523 and 526 includes an entrance polarizing plate 527, a liquid crystal panel 528, and an exit polarizing plate 529, as shown in FIG. 2. The entrance polarizing plate 527 is rectangular in shape and designed, e.g., to transmit light polarized in the short side direction and to absorb light polarized in the direction perpendicular thereto. The light beam passing through the entrance polarizing plate 527 enters the liquid crystal panel 528. The liquid crystal panel 528 has many pixels arranged in the form of an array and can change the polarization direction of the transmitted light at each pixel aperture with an external signal. In this embodiment, when the pixels are not driven, the liquid crystal panel 528 transmits the incident light while rotating its polarization direction by 90 degrees; when the pixels are driven, the liquid crystal panel 528 transmits the incident light without changing its polarization direction. The exit polarizing plate 529 has polarization characteristics in the direction perpendicular to the entrance polarizing plate 527. In other words, the exit polarizing plate 529 has a transmission axis in the long side direction of its rectangular outline and transmits light polarized in this direction. Therefore, the light beam that has entered the undriven pixel of the liquid crystal panel 528 and been transmitted with its polarization direction rotated by 90 degrees can pass through the exit polarizing plate 529 because it is polarized in the direction parallel to the transmission axis. On the other hand, the light beam that has entered the driven pixel of the liquid crystal panel 528 and been transmitted with its polarization direction unchanged is absorbed by the exit polarizing plate 529 because it is polarized in the direction perpendicular to the transmission axis.

The light beams thus transmitted through the light valve portion 503 enter the color combination optical system 504.

The color combination optical system 504 is formed by joining three triangular prisms (i.e., a first prism 530, a second prism 531 and a third prism 532) together. The three prisms are of the same shape, and the base of each prism is a right triangle having an interior angle of 30 degrees (hereinafter, referred to as a vertex angle). As shown in FIG. 5, the three prisms 530, 531 and 532 are joined in this order so that their vertex angles are next to each other. The side faces 530a, 531a and 532a opposite to the vertex angles of the first, second and third prisms 530, 531 and 532 are opposite to the light valve units 526, 523 and 519, respectively. A red-reflection dichroic mirror coated surface (a first dichroic mirror surface) 533 is formed at the joining plane between the first prism 530 and the second prism 531. Similarly, a blue-reflection dichroic mirror coated surface (a second dichroic mirror surface) 534 is formed at the joining plane between the second prism 531 and the third prism 532. The incidence plane 530a for the green light beam i.e., the side face of the first prism 530 opposite to the green light valve unit 526) is provided with a $\lambda/2$ phase-difference plate 536.

The green light beam emitted from the green light valve unit (the first light valve) 526 passes through the $\lambda/2$ phase-difference plate 536, where its polarization direction is twisted by 90 degrees. The green light beam thus twisted is p-polarized light with respect to the red- and blue-reflection dichroic mirror coated surfaces 533, 534. The green light beam enters the side face 530a (a first incidence plane) of the first prism 530, passes through the first prism 530, the red-reflection dichroic mirror coated surface 533, the second prism 531, the blue-reflection dichroic mirror coated surface 534, the third prism 532, and the side face of the third prism (an exit plane 537) in sequence, and enters the projection lens 505, which acts as a projection optical system.

The red light beam emitted from the red light valve unit (the second light valve) 523 is s-polarized light with respect to the red- and blue-reflection dichroic mirror coated surfaces 533, 534. The red light beam enters the side face 531a (a second incidence plane) of the second prism 531, passes through the second prism 531, and is reflected from the red-reflection dichroic mirror coated surface 533 to pass through the second prism 531 again. Then, it passes through the blue-reflection dichroic mirror coated surface 534, the third prism 532, and the exit plane 537 and enters the projection lens 505.

The blue light beam emitted from the blue light valve unit (the third light valve) 519 is s-polarized light with respect to the red- and blue-reflection dichroic mirror coated surfaces 533, 534. The blue light beam enters the side face 532a (a third incidence plane) of the third prism 532, passes through the third prism 532, and is reflected totally from the side face including the exit plane 537 to pass through the third prism 532 again. Then, it is reflected from the blue-reflection dichroic mirror coated surface 534 to pass through the third prism 532 yet again, passes through the exit plane 537, and enters the projection lens 505.

The projection lens 505 magnifies and projects the incident light onto a screen (not shown). Consequently, images of three light beams, each of which is formed by the light valve units 519, 523 and 526, are combined and displayed as a color image.

According to this embodiment, the color combination optical system 504 includes three prisms 530, 531 and 532 that are joined together in the form of a block. This makes it easy to ensure strength and durability, so that the accuracy can be kept high without any deviation after convergence has been adjusted. Therefore, images with high quality can be displayed for a long period of time.

Since the optical paths are filled with glass, the optical path length can be made relatively short (specifically, it can be reduced by two thirds of the optical path length measured when air is used instead of glass). Also, a relay optical system, which is required for the cross-prism system, is not necessary, thus contributing to a reduction in size of the apparatus.

Moreover, all the reflection planes of the color combination optical system 504 are the side faces of a single prism. Therefore, a favorable focus can be achieved. In addition, this embodiment can overcome such problems of the cross-prism system that a shadow appears due to the interface between the prisms and color irregularity is caused by the difference in spectral characteristic between two prism surfaces that form one reflection plane. Thus, it is possible to provide images with enhanced uniformity. The color combination optical system 504 can be formed basically by joining three prisms having the same shape. Unlike the cross-prism system, there is no need to align a surface of one prism with that of the other prism for joining. Accordingly, this embodiment has advantages over the conventional cross-prism system also due to its lower cost.

Since the color separation optical system 502 does not include a relay optical system, the whole size and cost of the apparatus can be reduced. Also, this can prevent color irregularity caused by reversing of the light source image in the relay optical system.

In Embodiment 3, the optical path lengths between the light source portion 501 and each of the light valve units 519, 523 and 526 are equal for the respective light beams. Similarly, the optical path lengths between the projection lens 505 and each of the light valve units 519, 523 and 526 are substantially equal for the respective light beams.

In Embodiment 3, the optical systems are formed so that the optical axis that goes through the blue-transmission dichroic mirror (the first dichroic mirror) 516 and the reflection mirror (the third reflection mirror) 517 is substantially parallel to the optical axis that goes through the exit plane 537 and the reflection mirror (the first reflection mirror) 524. This makes it possible to reduce the size of the apparatus in the direction perpendicular to the projection direction (i.e., the height). Moreover, a chief ray from the light source 506 enters the blue-transmission dichroic mirror 516 at the angle of incidence larger than 45 degrees, and thus the optical path lengths of the respective light beams are set to be equal in the color separation optical system 502.

In Embodiment 3, the integrator optical system 508 and the polarization direction converting optical system 509 are mounted in the light source portion 501. However, other configurations can be used that function in the same manner as that described above.

This embodiment uses a liquid crystal panel having a polarization effect as a light valve. However, note that the present invention is not limited thereto, and can employ an image display element that displays images without relying on polarization. As described in Embodiment 2, when dichroic mirrors are provided in the color combination optical system, the band of each light beam can be set without causing color mixture if those dichroic mirrors transmit p-polarized light for a green light beam and reflect s-polarized light for blue and red light beams, so that it is desirable to use light valves that utilize polarization. In this case, the polarization direction converting optical system 509 that can convert randomly polarized light into polarized light having a uniform polarization direction is used in the light source portion, thereby increasing the utilization efficiency of light from the light source.

In the optical systems of this embodiment, the optical path of a red light beam can be replaced with that of a blue light beam.

When giving importance to uniformity of projection images, it is desirable that the color combination optical system in each of Embodiments 1 to 3 is formed as a telecentric optical system.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A projection-type image display apparatus comprising:
   a light source portion for emitting a white light beam;
   a color separation optical system for separating the white light beam from the light source portion into red, green and blue light beams;
   a light valve portion for modulating each of the light beams from the color separation optical system;
   a color combination optical system for combining the light beams modulated by the light valve portion; and
   a projection lens for magnifying and projecting the combined light beam,
   wherein the color separation optical system comprises at least first and second dichroic mirrors and first, second and third reflection mirrors,
   the light valve portion comprises first, second and third light valves, one each for the respective light beams,
   the color combination optical system comprises first, second and third triangular prisms, each of which has a vertex angle of about 30 degrees,
   the first, second and third prisms are joined together in this order so that side faces of each prism that form the vertex angle are brought into contact to make the vertex angle of one prism next to that of the other prism,
   each of joining planes between the prisms is provided with a dichroic mirror surface acting as a color selection means,
   a side face of each prism opposite to the vertex angle is used as an incidence plane for each of the light beams,
   a side face of the third prism other than the plane joined to the second prism and the incidence plane is used as an exit plane for the combined light beam,
   the first, second and third reflection mirrors are arranged so as to correspond to the first, second and third light valves,
   the first, second and third light valves are arranged opposite to the incidence planes of the first, second and third prisms, respectively,
   optical path lengths of the three light beams between the light source portion and the respective light valves are substantially equal to one another,
   optical path lengths of the three light beams between the incidence planes and the exit plane are substantially equal to one another, the first dichroic mirror separates a third light beam from the white light beam emitted by the light source portion, and then the second dichroic mirror separates first and second light beams, the first light beam is reflected from the first reflection mirror, passes through the first light valve, and enters the incidence plane of the first prism, the second light beam is reflected from the second reflection mirror, passes through the second light valve, and enters the incidence plane of the second prism, and the third light beam is reflected from the third reflection mirror, passes through the third light valve, and enters the incidence plane of the third prism.

2. The apparatus according to claim 1, wherein a first dichroic mirror surface is provided at a joining plane between the first prism and the second prism, and a second dichroic mirror surface is provided at a joining plane between the second prism and the third prism, the first light beam entering the incidence plane of the first prism passes through the first prism, the first dichroic mirror surface, the second prism, the second dichroic mirror surface, and the third prism in sequence and exits from the exit plane, the second light beam entering the incidence plane of the second prism passes through the second prism, is reflected from the first dichroic mirror surface to pass through the second prism again, passes through the second dichroic mirror surface and the third prism, and exits from the exit plane, and the third light beam entering the incidence plane of the third prism passes through the third prism, is reflected from the side face including the exit plane to pass through the third prism again, is reflected from the second dichroic mirror surface to pass through the third prism yet again, and exit from the exit plane.

3. The apparatus according to claim 2, wherein both the light beams entering the second and third prisms are s-polarized light with respect to the first and second dichroic mirror surfaces.

4. The apparatus according to claim 2, wherein the light beam entering the first prism is p-polarized light with respect to the first and second dichroic mirror surfaces.

5. The apparatus according to claim 2, wherein the light beam entering the first prism is a green light beam.

6. The apparatus according to claim 1, wherein the first, second and third prisms are of the same shape.

7. The apparatus according to claim 1, wherein an optical axis that goes through the first dichroic mirror and the first reflection mirror is substantially orthogonal to an optical axis that goes through the first reflection mirror and the exit plane, and a chief ray of the white light beam enters the first dichroic mirror at an angle of incidence smaller than 45 degrees.

8. The apparatus according to claim 1, wherein an optical axis that goes through the first dichroic mirror and the third reflection mirror is substantially parallel to an optical axis that goes through the first reflection mirror and the exit plane, and a chief ray of the white light beam enters the first dichroic mirror at an angle of incidence larger than 45 degrees.

9. The apparatus according to claim 1, wherein light emitted from the light source portion is polarized light having a uniform polarization direction.

10. The apparatus according to claim 1, wherein each of the first, second and third light valve units comprises at least an entrance polarizing plate as a polarizer, a transmission-type liquid crystal panel, and an exit polarizing plate as an analyzer.

11. The apparatus according to claim 1, wherein a base of each of the triangular prisms is a right triangle.

* * * * *